United States Patent [19]

Parker et al.

[11] Patent Number: 4,938,543
[45] Date of Patent: Jul. 3, 1990

[54] ANTI-LOCK BRAKING/TRACTION CONTROL BRAKING SYSTEM

[75] Inventors: Donald L. Parker, Middletown, Ohio; Donald E. Schenk, Vandalia, Ohio; David F. Reuter, Beavercreek, Ohio; George N. Villec, Ann Arbor, Mich.; Alexander Kade, Grosse Pointe Woods, Mich.; Robert J. Hammersmith, Rochester Hills, Mich.; James F. Quinn, Troy, Mich.

[73] Assignee: General Motors Corporation, Detroit, Mich.

[21] Appl. No.: 353,895

[22] Filed: May 17, 1989

[51] Int. Cl.$^5$ ............................................. B60T 8/58
[52] U.S. Cl. .................................. 303/100; 180/197; 303/103
[58] Field of Search ............... 180/197; 303/93, 96, 303/100, 103, 106, 110, 111, 114, 117, 119

[56] References Cited

U.S. PATENT DOCUMENTS

| | | | |
|---|---|---|---|
| 2,845,147 | 7/1958 | Hill | 188/152 |
| 3,420,580 | 5/1967 | Dymond . | |
| 3,549,210 | 12/1970 | Birge et al. | 303/21 |
| 3,698,772 | 10/1972 | Nixon | 303/21 |
| 3,790,225 | 2/1974 | Wehde | 303/21 |
| 3,802,745 | 4/1974 | Strifler et al. | 303/3 |
| 3,827,758 | 9/1974 | Hansen | 303/3 |
| 3,887,238 | 6/1975 | Bennett | 303/7 |
| 3,963,277 | 6/1976 | Chiba | 303/21 |
| 4,381,049 | 4/1983 | Crossman | 188/72.7 |
| 4,398,389 | 8/1983 | Horvath | 60/545 |
| 4,520,907 | 6/1985 | Sikora | 188/156 |
| 4,653,815 | 3/1987 | Agarwal et al. | 303/100 |
| 4,756,391 | 7/1988 | Agarwal et al. | 188/106 P |
| 4,807,134 | 2/1989 | Agarwal et al. | 303/100 X |
| 4,836,617 | 6/1989 | Resch | 303/100 |

Primary Examiner—Duane A. Reger
Attorney, Agent, or Firm—Ernest E. Helms

[57] ABSTRACT

An integrated anti-lock braking system (ABS)/traction control (TC) braking system for a vehicle having a fluid activated brake for a wheel is provided the system in one embodiment includes a system controller for signaling the system to an ABS or TC mode, a master cylinder for delivering pressurized fluid to the wheel brake, an actuator with a longitudinal bore having a first stop. A hollow primary piston is slidably mounted within the longitudinal bore biased towards the first stop. The interior of the primary piston is fluidly connected with its exterior. A secondary piston is slidably mounted within the primary piston and movable in one direction to pressurize the wheel brake and movable in an opposite direction to relieve said wheel brake in response to the controller.

15 Claims, 2 Drawing Sheets

ANTI-LOCK BRAKING/TRACTION CONTROL BRAKING SYSTEM

FIELD OF THE INVENTION

The field of the present invention is that of an integrated anti-lock braking system (ABS) and traction control system (TC) for a vehicle.

DISCLOSURE STATEMENT

Anti-lock braking systems typically modulate the pressure delivered to a vehicle wheel brake to prevent the vehicle wheel from locking up in the braking condition. Conversely, traction control typically incorporates an automatic braking system which actuates the brakes to prevent spinning of the vehicle wheel thereby maximizing the traction which can be exerted by that wheel. A more detailed analysis of anti-lock braking systems can be found in commonly assigned U.S. Pat. Nos. 4,756,391 and 4,653,815. A more detailed explanation of traction control systems which utilize actuation of a vehicle wheel brake for traction control can be found in commonly assigned Application U.S. Pat. No. 223,327 filed July 8, 1988.

SUMMARY OF THE INVENTION

The present invention provides an ABS and TC integration apparatus and method of utilization thereof which allows a common actuator mechanism to provide the ABS and TC functions.

It is an object of the present invention to provide an integrated ABS/TC braking system and method of utilization thereof.

Other objects and advantages of the present invention can become more apparent to those skilled in the art as the nature of the invention is better understood from the accompanying drawings and a detailed description.

DETAILED DESCRIPTION OF THE PREFERRED EMBODIMENT

DETAILED DESCRIPTION OF THE DRAWINGS

Figure 1:
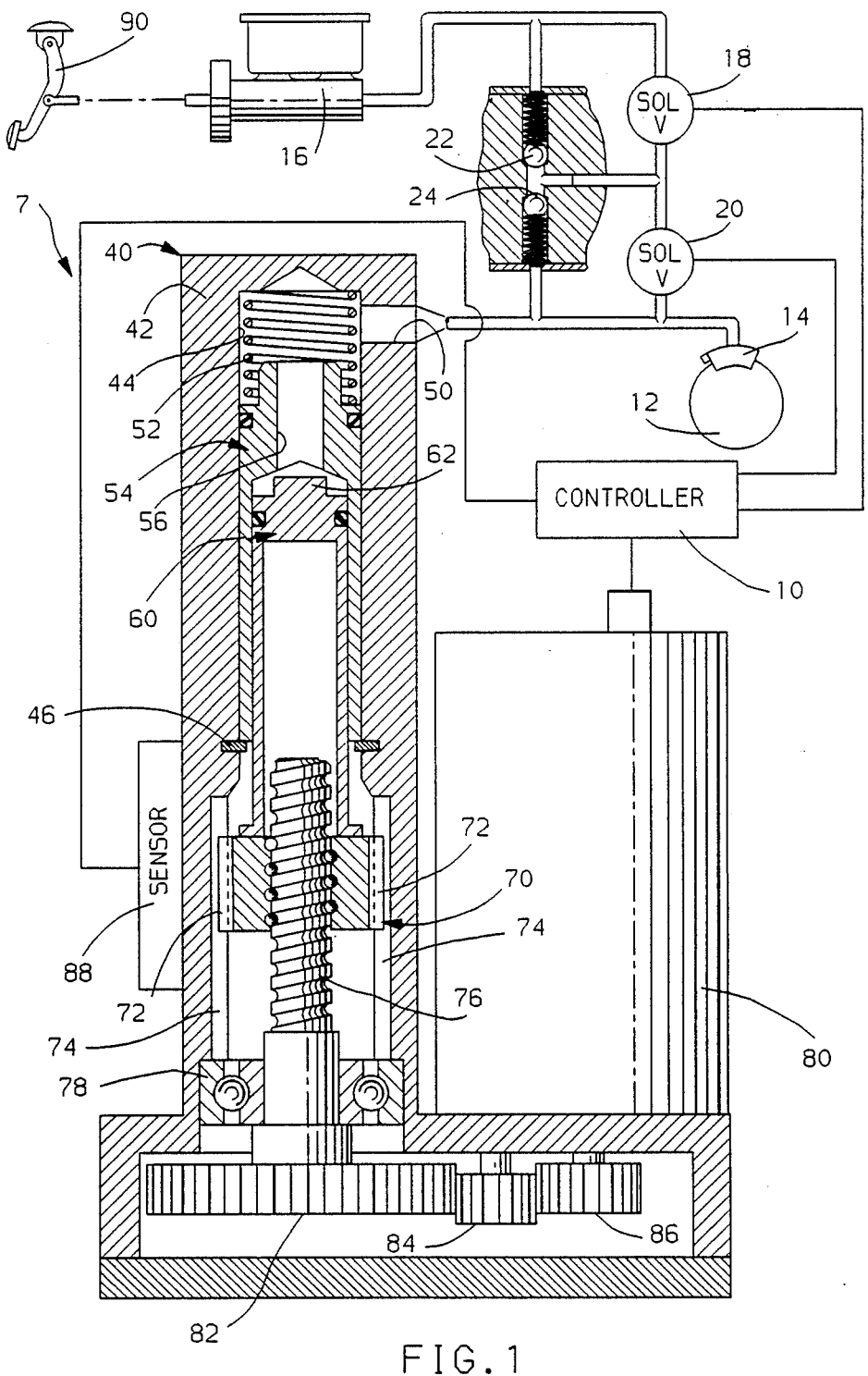
FIG. 1 is a sectional view of a preferred embodiment ABS/TC integrated braking system according to the present invention.

Referring to FIG. 1, the anti-lock braking system and traction control (ABS/TC) integrated braking system 7 has a system controller 10. The system controller via various sensors, which are not shown, is cognizant of a rotative condition of the vehicle wheel 12. According to parameters which are not part of this invention, the system controller 10 will signal to place the braking system 7 into an ABS or TC mode.

The wheel 12 experiences restraint from angular rotation by action of a fluid activated wheel brake 14 (also referred to as the wheel brake cylinder). To deliver pressurized fluid to the brake there is provided a master cylinder 16. The master cylinder 16 is connected to the wheel brake 12 via first 18 and second 20 solenoid valves which are connected to one another in series. The first solenoid valve is normally open and closes to isolate the wheel brake 14 from the master cylinder 16 when the controller 10 signals the braking system 7 to place it in an ABS mode. In like manner, the second solenoid 20 is closed when the controller signals to place the system in the TC mode.

In parallel with the first solenoid valve 18 and in series with the second solenoid valve 20 is a first check valve 22 allowing fluid flow only towards the master cylinder 16. The check valve 22 limits the pressure in the wheel brake 14 when the first solenoid valve 18 is closed to a value equal to or less than that of the master cylinder 16. In a similar fashion, in series with the first check 22 and in parallel with the second solenoid valve 20 is a second check valve 24. The second check valve 24 is configured to allow flow from the master cylinder 16 to the wheel brake 14 but not to allow flow from the vehicle wheel brake 14 towards the master cylinder 16. The second check valve 24 acts to allow override of the traction control function whenever the vehicle occupants steps upon the pedal activating the master cylinder 16 and when the second solenoid valve 20 is in the closed position.

The braking system 7 has an actuator 40 having a frame 42 with a longitudinal bore 44. The bore 44 has a first stop means 46 (provided by a spring clip), and in the preferred embodiment generally toward one end, will have a first fluid connection 50 with the master cylinder 16 and with the wheel brake 14.

Slidably and sealably mounted within the bore 44 and biased by a spring 52 against the stop 46 is a hollow primary piston 54. The primary piston 54 also has a bore 56 fluidly connecting the interior with the exterior of the primary piston 54.

Slidably and sealably mounted within the interior of the primary piston 54 is a secondary piston 60. The secondary piston 60 is movable towards the fluid connection 50 to pressurize the fluid in the wheel brake 14, or is movable in an opposite direction to relieve (release) the wheel brake 14. In an extreme position with respect to the primary piston 54, the secondary piston 60 has a head portion 62 making contact with the primary piston 54. Movement of the secondary piston 60 towards the bore connection 50 when the secondary piston 60 is at an extreme position with respect to the primary piston 54 will cause the primary piston 54 to move in unison with the secondary piston.

The secondary piston 60 is operatively associated with an in the instance shown fixably connected with a nonrotative nut 70. The nut 70 has flange members 72 which make contact with secondary alignment edges 74 of the bore to keep the nut 70 (and piston 60) from rotating. The second piston 60 via the nut 70 is penetrated by and threadably engaged with a diver member referred to as a power or drive screw 76. The power screw 76 is mounted within the longitudinal bore by a bearing 78 and, at its lower end, can be surrounded by a pair of bevel washers (not shown) which cushion possible contact of the nut 70 when bottoming out the secondary piston 60 within the bore 44.

The power screw 76 is driven by a motor 80 which is gearably engaged with the power screw 76 by a gear train comprised of a large primary 82 and a secondary idler gear 84 and motor pinion 86. However, in an alternative embodiment not shown, the primary gear is directly engaged with the pinion gear. The pinion gear 86 is attached to a rotor of a reversible DC motor 80.

The actuator 40 will also have a sensor 88, typically a magnetic or a similar electrical sensor, which will allow the system controller 10 to know the exact location of the nonrotative nut 70 (thereby knowing the location of the secondary piston 60).

The operation of the system is as follows. In normal brake operation, the first 18 and second 20 solenoid valves will be open, and fluid from the master cylinder 16 will be delivered to the wheel brake 14 as desired by the vehicle operator. To relieve the wheel brake 14, fluid from the wheel brake 14 will pass back through the second 20 and first 18 solenoid valves to the master cylinder 16.

When sudden braking occurs, such as in a panic stop on a low coefficient surface and wheel 12 lock up is detected by the system controller 10, the first solenoid valve 18 will be signaled by the system controller 10 to close. The above action will isolate the master cylinder 16 from the wheel brake 14; therefore, the vehicle operator will not have the pedal feel, which typically comes from the effect of feeling pulsations of the anti-lock braking system during its operation.

The controller 10 will signal the motor 80 to rotate the power screw 76 in such a manner to retract the secondary piston 60. The above will cause the braking system 7 to enter an initial ABS relief cycle. Since the primary piston 54 is spring biased against the stop 46, it does not move. However, the removal of the secondary piston 60 with respect to the primary piston 54 increases the volume of the braking system (exposed to the wheel brake 14), therefore, the pressure at the wheel brake 14 is lowered. To reapply the brake, the controller 10 will signal the motor 80 to reverse, causing the secondary piston 60 to again proceed towards the fluid connection 50 system 7 when the vehicle operator steps on the brake pedal 90. The second check valve 24 can be deleted and its function retained by activating the second solenoid valve 20 to the open position whenever the brake pedal 90 is moved by connecting the second solenoid valve 20 with the brake light circuit.

In either the TC or the ABS mode of operation, wherever there is a signal of the cessation of the condition, the sensor 88 will determine the location of the nonrotative nut 70 and signal the system controller 10 to actuate the motor 80 to bring the nonrotative nut 70 to a neutral non-actuated position. Typically, the neutral position will be the position shown in FIG. 1, wherein the head 62 on the secondary piston 60 is clearly adjacent to or making contact with the primary piston 54. In other embodiments, the secondary piston 60 will be activated to an extreme position and then will be allowed to retract to the neutral position.

The embodiment of an ABS/TC integrated braking system 7 shown in FIG. 1 typically will require some type of brake on the motor 80 rotor when the system is in a neutral position, to prevent the pressure from the master cylinder 16 back driving the secondary piston 60 downward. The above may be an electromagnetic force type brake which brakes the motor rotor or may be a spring tang-like clutch. The exact details of such a brake are not part of this invention.

Figure 2:
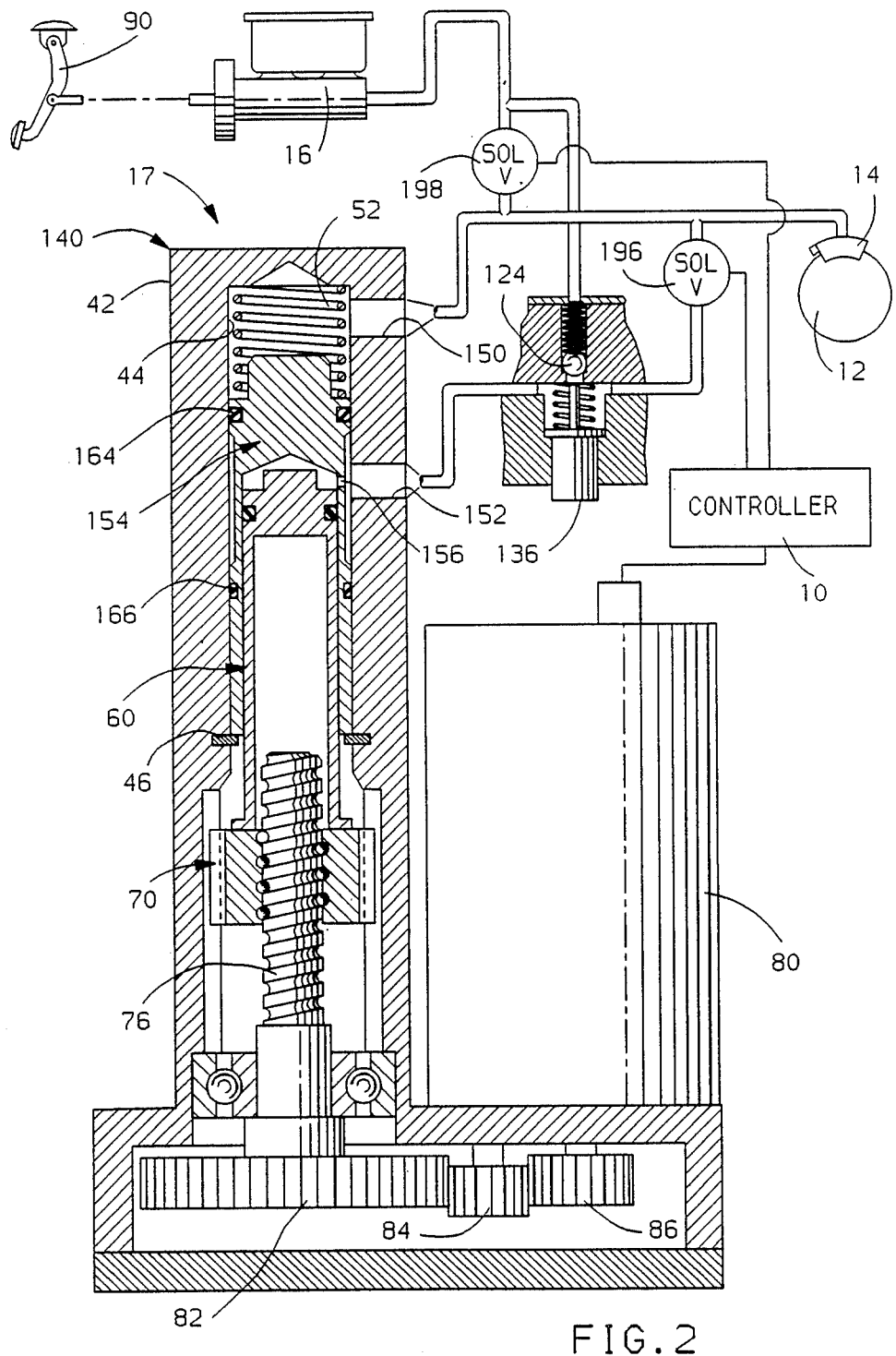
FIG. 2 is a sectional view of a preferred embodiment ABS/TC integrated braking system according to the present invention which is an alternative to that shown in FIG. 1.

Referring to FIG. 2, wherein similar items are given identical reference numerals. There is provided an alternative preferred embodiment 17 of the present invention. The alternative preferred embodiment, in certain situations, provides a hydraulic lock between the primary 154 and secondary piston 60. The actuator 140 has a frame 42 with a longitudinal bore 140 with the first 150 and second 152 fluid connections with the wheel brake 14. The first 150 and second 152 fluid connections of the longitudinal bore 44 are spaced from one another.

The first fluid connection of the bore 150 is also fluidly connected with the master cylinder 16 via a first traction control solenoid valve 198 which is normally open. The second fluid connection 152 of the bore 44 with the wheel brake 14 is also connected with the master cylinder space 16; however, inserted in between is a check valve 124 allowing flow from the bore second fluid connection 152 to the master cylinder 16 only. Opposite the check valve 124 is a fill valve 136 allowing vacuum-actuated filling of the braking system 17 during vehicle assembly. Valving the flow between the wheel brake 14 and the bore second fluid connection 152 is a normally closed second solenoid valve 196 which is activated to the open position during ABS operation.

In a manner as previously described, the primary piston 154 is spring 52, biased towards a stop 46. However, the primary piston 154 has a radial bore 156 which fluidly connects the exterior and interior of the hollow primary piston 154. Also, the primary piston 154 has two seal rings 164, 166 which allow the primary piston to seal with respect to the actuator bore 44 in two locations spaced from one another and separated by the radial bore 156.

As shown with the preferred embodiment, the primary piston has an annular valley between its upper 164 and lower 166 sealing rings.

In normal operation of the brakes, the traction control solenoid valve 198 will be opened and the ABS solenoid valve 196 will be closed. Fluid will normally proceed from the master cylinder 16 to the wheel brake 14 to activate the wheel brake 14 and will flow from the wheel brake 16 back to the master cylinder 16 to relieve the wheel brake 14. Since the primary piston 154 is spring biased against the stop 46 (the stop is usually provided by a spring clip which fits within an annular groove of the actuator longitudinal bore 44), the primary piston 154 will not move. The pressure at the wheel brake 14 is not felt at the bore second fluid connection 152 since the ABS solenoid valve 196 is closed, and pressure cannot flow from the master cylinder 16 through the check valve 124 to the second fluid connection 152. In an ABS mode, the traction control solenoid valve 198 will close and the ABS solenoid valve 196 will open. Contemperaneously, the motor 80 will be signaled to power the power screw 76 to urge the rotative nut 70 downward, retracting the secondary piston 60, increasing the volume of the braking system to relieve the pressure of the wheel brake 14. To reactivate the wheel brake 14, the motor 80 will be reversed, forcing the secondary piston 60 upward again. If for some reason additional pressure is needed, the secondary piston 60 will come to an extreme position with respect to the primary piston 154 and thereafter will move both pistons up in unison to supply pressure to the wheel brake 14. The check valve 124 prevents excessive wheel brake pressure in relationship to master cylinder pressure as previously described for the prior embodiment 7 of the present invention.

If a TC condition is signaled by the system controller 10, the traction control solenoid valve 198 will close, isolating the wheel brake 14 from the master cylinder 16, and the ABS solenoid valve 196 will remain closed. The motor 80 will be activated to drive the secondary piston 60 upward pressurizing the wheel brake 16 via connection 150. To release the wheel brakes on a TC relief cycle, the secondary piston 60 will be reversed.

When either TC or ABS cycles have ended, resetting of the braking system 17 integration to a neutral position is accomplished by closing the ABS solenoid valve 196 and opening the traction control solenoid valve 198 and programming the motor 80 to run the secondary piston 60 upward until the primary piston 154 hits the top of the longitudinal bore 44. The primary piston 154 hitting the bore top causes a stalling condition in the motor 80, wherein the power to the motor is shut off. Since the ABS solenoid valve 194 is closed, a hydraulic locking occurs between the secondary 60 and primary 154 pistons holding them together. As the biasing spring 52 returns the primary piston 154 to its position against the stop 46, the hydraulic locking will maintain the secondary piston 60 in its desired neutral position. The braking system 17 is again ready for normal braking operation. No braking device will be required on the motor rotor or to the gear train to retain the secondary piston 60 in its neutral position due to the hydraulic locking which occurs, which will be maintained so long as the ABS solenoid valve 196 is closed.

In still another alternative embodiment of the present invention (not shown), the secondary piston can be moved by a cam actuator as described in commonly assigned U.S. Ser. No. 341,986, "Apparatus and Method Cam Modulator for Anti-Lock Braking System".

While embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. An integrated anti-lock braking system (ABS)/-traction control (TC) braking system for a vehicle having a fluid activated brake for a wheel comprising:
   a system controller cognizant of the condition of said wheel for signaling said system to an ABS or TC mode;
   master cylinder means for delivering pressurized fluid to said wheel brake;
   an actuator frame with a longitudinal bore, said bore having a first stop, and said bore being fluidly connected with said master cylinder means and said wheel brake;
   a first normally open solenoid valve means for isolating said master cylinder means from said wheel brake when said controller places said system in an ABS or TC mode;
   a hollow primary piston slidably sealably mounted within said longitudinal bore biased towards said first stop, the interior of said primary piston being fluidly connected with the exterior of said primary piston;
   a secondary piston slidably sealably mounted within said primary piston movable toward said bore fluid connection to pressurize said wheel brake and movable in an opposite direction to relieve said wheel brake, said secondary piston having an extreme position with respect to said primary piston wherein said pistons move in unison; and
   reversible means to move said secondary piston in response to said controller.

2. An integrated ABS/TC braking system as described in claim 1 wherein said reversible means to move said secondary piston includes a reversible motor gearably engaged with a driven member, said driven member being threadably engaged with said secondary piston.

3. An integrated ABS/TC braking system as described in claim 2 wherein said secondary piston is fixably attached with a nonrotative nut and said driven member is a screw threadably engaged and encircled by said nut.

4. An integrated ABS/TC braking system as described in claim 1 further including second solenoid valve means normally open in series with said first solenoid valve means, and wherein there is a check valve in series with said first solenoid valve means allowing flow only from said second solenoid valve means towards said master cylinder means.

5. An integrated ABS/TC braking system as described in claim 1 further including sensing means allowing said controller to be cognizant of the position of said secondary piston.

6. A method of providing anti-lock braking and traction control to a fluid-activated brake of a vehicle wheel comprising:
   recognizing the condition of said wheel and signaling said brake to an anti-lock or traction control mode;
   delivering pressurized fluid to said wheel brake from a master cylinder means;
   fluidly connecting said master cylinder and said wheel brake with an actuator frame having a longitudinal bore with a first stop means;
   isolating said master cylinder from said wheel brakes in response to a signal given by said controller when placing said brake into an anti-lock or traction control mode;
   slidably sealably mounting within said longitudinal bore a primary piston with an interior fluidly connected with said primary piston exterior and being biased against said first stop means;
   slidably sealably mounting within said primary piston a secondary piston; and
   moving said secondary piston towards the actuator fluid connection with said wheel brake to pressurize said wheel brake in response to a signal given by said controller and moving said secondary piston in an opposite direction to relieve said wheel brake in response to a signal given by said controller and when said secondary piston moves to an extreme position with respect to said primary piston, moving said pistons in unison.

7. An integrated ABS/TC braking system for a vehicle having a fluid-activated brake for a wheel comprising.
   a system controller cognizant of the condition of said wheel for signaling said system to an ABS or TC mode;
   a master cylinder means for delivering pressurized fluid to said wheel brake;
   an actuator frame with a longitudinal bore, said bore having a first stop and said bore being fluidly connected generally along one end with said master cylinder and with said wheel brake;
   a first normally open solenoid valve for isolating said master cylinder from said wheel brake when said controller places said system in an ABS mode;
   a second normally open solenoid valve in series with said first solenoid valve being normally open for isolating said master cylinder from said wheel brake when said system is in a TC mode;
   a first check valve in parallel with said first solenoid valve allowing flow from said wheel to said master cylinder when the pressure within said master cylinder is lower than the pressure within said wheel brake when said system is in a ABS mode;

a second check valve in series with said first check valve allowing flow from said master cylinder to said wheel brake when the pressure within said master cylinder is greater than the pressure within said wheel brake when said system is in a TC mode;

a hollow primary piston slidably sealably mounted within said longitudinal bore spring biased towards said first stop, said interior of said primary piston being fluidly connected with the exterior of said primary piston;

a secondary piston slidably sealably mounted within said primary piston movable toward said bore fluid conection to pressurize said wheel brake and movable in an opposite direction to relieve said wheel brake, said secondary piston having an extreme position with respect to said primary piston wherein said pistons move in unison;

a nut operatively associated with said secondary piston means to prevent said nut from rotating;

a drive screw threadably engaged and projecting through said nut;

a gear train connected with said drive screw; and a reversible motor connected with said gear train for moving said secondary piston in response to the signals given by said controller.

8. An integrated ABS/TC braking system for a vehicle having a fluid-activated brake for a wheel, said braking system comprising:

a system controller cognizant of the condition of said wheel for signaling said system to an ABS or TC mode;

master cylinder means for delivering pressurized fluid to said wheel brake;

an actuator frame with a longitudinal bore, said bore having a first stop, said bore generally along one end having a first fluid connection with said master cylinder means and said wheel brake, and said bore having a second fluid connection with said wheel brake;

a first normally open solenoid valve between said wheel brake and said master cylinder means for isolating said wheel brake from said master cylinder means when said system is in an ABS or TC mode;

a second normally closed solenoid valve between said bore second fluid connection and said wheel brake for fluidly connecting the same when said system is in an ABS mode;

a hollow primary piston slidably mounted within said bore biased toward said first stop, said primary piston having an interior being fluidly connected with said primary piston exterior, and said primary piston sealing said bore in two spaced locations separated by said fluid connection of said primary piston interior and exterior;

a secondary piston slidably sealably mounted within said primary piston movable toward said bore first fluid connection to pressurize said wheel brake and movable in an opposite direction to relieve said wheel brake, said secondary piston having an extreme position with respect to said primary piston, wherein said pistons move in unison; and means to reversibly move said secondary piston in response to said controller.

9. An integrated ABS/TC braking system as described in claim 8 wherein a hydraulic lock is formed between said secondary and primary pistons when said second solenoid valve is closed.

10. An integrated ABS/TC control braking system as described in claim 8 wherein said means to reversibly move said secondary piston includes a reversible motor gearably engaged with a driven member, said driven member being threadably engaged with said secondary piston.

11. An integrated ABS/TC braking system as described in claim 8 wherein said piston is fixably attached with a nonrotative nut and said first driven member is a screw threadably engaged and encircled by said nut.

12. An integrated ABS/TC braking system as described in claim 8 further including a check valve between said master cylinder means and said second fluid connection of said longitudinal bore with said wheel brake, said check valve allowing fluid flow only towards said master cylinder means.

13. An integrated ABS/TC braking system as described in claim 12 further including a valve for vacuum filings of said braking system.

14. An integrated ABS/TC braking system for a vehicle having a fluid-activated brake for a wheel, said system comprising:

a system controller cognizant of the condition of said wheel for signaling said system to an ABS or TC mode;

a master cylinder for delivering pressurized fluid to said wheel brake;

an actuator frame with a longitudinal bore, said bore having a first stop, and generally along one end of said bore having a first fluid connection with said master cylinder and with said wheel brake and said bore having a second fluid connection with said wheel brake spaced from said first fluid connection;

a first normally open solenoid valve between said wheel brake and said master cylinder for isolating said wheel brake from said master cylinder when said system is in an ABS or TC mode;

a second normally closed solenoid valve between said bore second fluid connection and said wheel brake for connecting the same when said system is in an ABS mode;

a check valve fluidly connected between said master cylinder and said bore second fluid connection allowing fluid flow from said bore second fluid connection to said master cylinder only;

a hollow primary piston slidably mounted within said bore spring biased toward said first stop, said primary piston interior being fluidly connected via a radial passage with said primary piston exterior, said primary piston sealing said bore in two spaced locations separated by said fluid connected between said interior and exterior of said primary piston;

a secondary piston with a connected nut slidably sealably mounted within said primary piston interior movable toward said bore first fluid connection to pressurize said wheel brake and movable in an opposite direction to relieve said wheel brake, said secondary piston having an extreme position with respect to said primary piston wherein said pistons move in unison, and wherein said secondary piston is hydraulically locked to said primary piston when said second solenoid valve is closed;

means to prevent rotation of said nut;

a drive screw projecting through and threadably engaged with said nut;

a gear train connected with said drive screw; and a reversible motor connected with said gear train for powering said secondary piston in response to signals received from said controller.

15. A method of anti-lock braking and traction controlling a vehicle wheel fluid-activated brake, said method comprising:

recognizing the rotative condition of said wheel and signaling a braking system to an ABS or traction mode;

delivering pressurized fluid to said wheel brake with a master cylinder;

connecting said wheel brake and said master cylinder at a first connection with an actuator having a longitudinal bore with a stop means, and connecting said longitudinal bore, in an area spaced away from said first fluid connection, with said wheel brake at a second fluid connector;

isolating said wheel brake from said master cylinder when said system is in an ABS or TC mode with a first normally open solenoid valve means between said wheel brake and said master cylinder;

allowing fluid flow between said second fluid connection of said bore with said wheel brake when said system is in an ABS mode;

slidably mounting within said bore a primary piston having an interior fluidly connected with said exterior of said primary piston, and biasing the same toward said first stop;

sealing said primary piston within said bore in two spaced locations separated by the fluid connection between said interior and exterior of said primary piston;

slidably sealably mounting within said primary piston a secondary piston movable towards said bore of first fluid connection to pressurize said wheel brake and movable in an opposite direction to relieve said wheel brake, said secondary piston having an extreme position with respect to said primary piston wherein said pistons move in unison; and reversibly moving said secondary piston in response to signals given by said controller.

* * * * *